(12) United States Patent
Kanner et al.

(10) Patent No.: US 6,739,628 B2
(45) Date of Patent: May 25, 2004

(54) FRANGIBLE HOSE CONNECTOR

(75) Inventors: Rowland W. Kanner, Guntersville, AL (US); Michael Parcus, Arab, AL (US); Larry Lee Young, Arab, AL (US)

(73) Assignee: Atrion Medical Products, Inc., Arab, AL (US)

( * ) Notice: Subject to any disclaimer, the term of this patent is extended or adjusted under 35 U.S.C. 154(b) by 0 days.

(21) Appl. No.: 10/161,560

(22) Filed: Jun. 3, 2002

(65) Prior Publication Data

US 2002/0180207 A1 Dec. 5, 2002

Related U.S. Application Data

(60) Provisional application No. 60/295,997, filed on Jun. 5, 2001.

(51) Int. Cl.[7] .............................................. F16L 35/00
(52) U.S. Cl. ................................. 285/4; 285/3; 285/39; 604/200; 604/244; 604/905
(58) Field of Search .................. 285/3, 4, 39; 604/200, 604/244, 905

(56) References Cited

U.S. PATENT DOCUMENTS

| | | | | |
|---|---|---|---|---|
| 3,217,710 A | * | 11/1965 | Beall et al. ................. 604/408 |
| 3,342,179 A | * | 9/1967 | Ellmann ..................... 604/408 |
| 5,221,267 A | | 6/1993 | Folden | |
| 5,423,768 A | | 6/1995 | Folden et al. | |
| 5,836,619 A | * | 11/1998 | Shemesh et al. ............... 285/4 |
| 6,325,547 B1 | * | 12/2001 | Cammons et al. ............ 385/76 |

* cited by examiner

*Primary Examiner*—David Bagnell
*Assistant Examiner*—Giovanna Collins
(74) *Attorney, Agent, or Firm*—Trexler, Bushnell, Giangiorgi, Blackstone & Marr, Ltd.

(57) ABSTRACT

A frangible hose connector that has a knit line at the intended point of fracture, as opposed to a circumferential groove or notch. The knit line provides a break zone which has a lower tensile strength than that of the parent material, thereby providing that the connector is relatively easy to fracture. The connector also includes finger grips which makes breaking the connector easier. The finger grips provide that the connector is configured to be fractured via a twisting or torsion force, as opposed to a bending force. As such, the connector tends to break in a manner wherein fluid does not fling or spray. The connector is formed of plastic, and the knit line is created during the plastic injection molded process, wherein two mold fronts are "squared-up" and meet in the mold cavity to form the knit line.

12 Claims, 12 Drawing Sheets

FRANGIBLE HOSE CONNECTOR

BACKGROUND

This invention generally relates to breakable couplings used in medical applications wherein fluids are transported to and from patients, and more particularly relates to a "twist to separate" breakable coupling which has a knit line at the intended point of fracture.

Within certain medical applications, it is desirable to withdraw fluids from or introduce fluids to a patient. One such application is peritoneal dialysis (e.g. continuous ambulatory peritoneal dialysis (CAPD) or automated peritoneal dialysis (APD)), wherein a cleansing fluid is introduced from a delivery line to a catheter which has been inserted into the abdomen of a patient. Waste is removed from the patient via the catheter. The delivery line which delivers the cleansing fluid to the patient is generally in the form of flexible tubing which transfers fluid to and from the catheter site. The catheter enters the peritoneal cavity, and a catheter connector is disposed between the tubing and the catheter. A releasable manual clamp is typically threaded onto the tubing to occlude the tubing as it is connected to the catheter through the catheter connector. Typically, a permanent manual clamp is also included to permanently occlude the tubing when the dialysis is completed so that the tubing can be disconnected from the catheter connector without any spilling of the drained fluids. A wide variety of tubing sets are known in the art and are used in a number of different applications.

Upon completion of the dialysis, it is necessary to disconnect the patient from the tubing set. This is normally accomplished by permanently occluding the delivery line by closing the permanent manual clamp, and then cutting the tubing on the side of the permanent manual clamp away from the patient. The permanent manual clamp thereby occludes the delivery line on the patient side in order to prevent any spilling of the drained fluid. After the tubing is cut, a clamp on the catheter is used to occlude the catheter, and the stub of the tubing is removed from the catheter. When dialysis is to be repeated, a new tube is connected to the catheter, the catheter clamp is loosened, and the process is repeated.

The cutting of the delivery line is normally accomplished with a pair of scissors or a knife. This, of course, requires that a pair of scissors or knife be available. Moreover, because peritoneal dialysis therapy is purposely designed so that it can be administered by the patient without the help of a nurse or other person, such as at home or at work, the pair of scissors or knife must be located so that the patient can reach them while still connected to the tubing set.

Another problem with a system in which the delivery line is cut with a knife or a pair of scissors is that there is no indicator on the delivery line of where it should be cut. A frequent problem, therefore, is that the patient accidentally cuts the delivery line on the patient side of the clamp, thereby spilling drain fluid. Even worse, the patient sometimes accidentally cuts the catheter rather than the tubing, thereby requiring the removal of the damaged catheter and the insertion of a new catheter.

Breakable tubing couplings which provide a pre-defined point of fracture (i.e. a pre-defined break zone), and provide that fracture can be accomplished without having to use a knife or a pair of scissors, are known in the prior art. Typically, such breakable tubing couplings provide as such viz-a-viz a molded-in circumferential groove which serves as the intended point of fracture. Two such breakable tubing couplings are disclosed in U.S. Pat. Nos. 5,221,267 and 5,423,768.

It is well known that a groove or notch can serve to concentrate stress upon parts that are loaded in a manner that places the notched or grooved side of the part under tension. In an injection molded part, plastic resin within such a groove may have the same or, depending upon the resin, even greater tensile strength on a pounds per square inch (p.s.i.) basis when compared to the parent material. By virtue of the overall lower cross sectional area of material present at the groove as compared to the rest of the part, any applied bending forces are concentrated at the groove which allows the part to predictably break along the groove in the same manner as a notch. Local restrictions within an injection mold that entirely traverse the direction of flow of injected plastic resin can cause the resin's polymer chains to begin to align along the axis of flow resulting in material that is "linear". Linear plastics have greater tensile strength than the normal random polymer chain orientation as a result of having more of the polymer chains commonly aligned (this phenomenon is employed to advantage in forming integral "living hinges" in plastic parts and is often used in extrusion processes for greater longitudinal tensile strength and durability).

Generally, prior art couplings are designed such that a user must grip the coupling on both sides of the intended point of fracture (i.e. on both sides of the circumferential groove), and apply bending forces to effect the break at the groove. Due to the fact that the plastic resin within the groove may have the same or even greater tensile strength compared to the parent material, breakable couplings which provide a groove as the intended point of fracture can require relatively significant bending forces to effect the break. This is disadvantageous, and is especially disadvantageous in a case where a patient is weak and is attempting to break the coupling at home. Generally, prior art breakable couplings which provide a groove as the intended point of fracture do not include any type of break assistance structure, such as finger grips.

Additionally, by relying upon bending to effect the fracture, prior art breakable couplings generally break apart rapidly when broken. The instantaneous release of the user's bending energy results in the broken ends of the coupling accelerating apart at the moment of break. This acceleration of the ends may serve to fling or spray fluid (perhaps contaminated fluid) into the surrounding environment, which is undesirable regardless of the setting (i.e. a clinical setting, a patient's home or work, etc.).

OBJECTS AND SUMMARY

An object of an embodiment of the present invention is to provide a frangible hose connector which includes a knit line at the intended point of fracture.

Another object of an embodiment of the present invention is to provide a frangible hose connector which provides a pre-defined point of fracture that does not include a circumferential groove or notch.

Still another object of an embodiment of the present invention is to provide a frangible hose connector which includes break assistance structure, such as finger grip levers.

Still yet another object of an embodiment of the present invention is to provide a frangible hose connector which is configured to be fractured via a "twist to separate" arrangement (i.e. viz-a-viz a twisting or torsion force), as opposed to a bending force.

Yet still another object of an embodiment of the present invention is to provide a frangible hose connector which has a lower tensile strength at an intended point of fracture than that of the parent material, thereby providing that the connector is relatively easy to fracture.

Another object of an embodiment of the present invention is to provide a frangible hose connector which is easy to break apart and is designed to break in a manner wherein fluid does not tend to fling or spray into the surrounding environment.

Briefly, and in accordance with at least one of the foregoing objects, an embodiment of the present invention provides a frangible hose connector that includes a body having a first end and a second end generally opposite the first end. A throughbore extends through the body, and a knit line is provided in the body, between the first and second ends. The knit line defines an intended point of fracture of the body.

Preferably, the connector is formed of plastic and the knit line is created during a plastic injection molded process, wherein the flow of molten plastic within the mold cavity is controlled during the molding process in a manner which creates the knit line. At least one mold cavity fill point is provided on each side of the intended point of fracture, and when the plastic is injected, two mold fronts meet to define the knit line. To provide a mold cavity fill point on each side of the intended point of fracture, separate gates can be employed. Alternatively, two divided flow fronts from a single gate can be employed. Regardless, preferably the mold cavity includes stepped features which cause the mold fronts to "square-up" with each other as they converge at the intended point of fracture, thereby providing a knit line which is generally regular. Preferably, such a process provides a knit line which has a lower tensile strength than that of the parent material. Ideally, the mold fronts do not exchange polymer chains and only abut very tightly, thereby producing a part which is effectively comprised of two weakly bonded pieces, bonded at the intended point of fracture.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
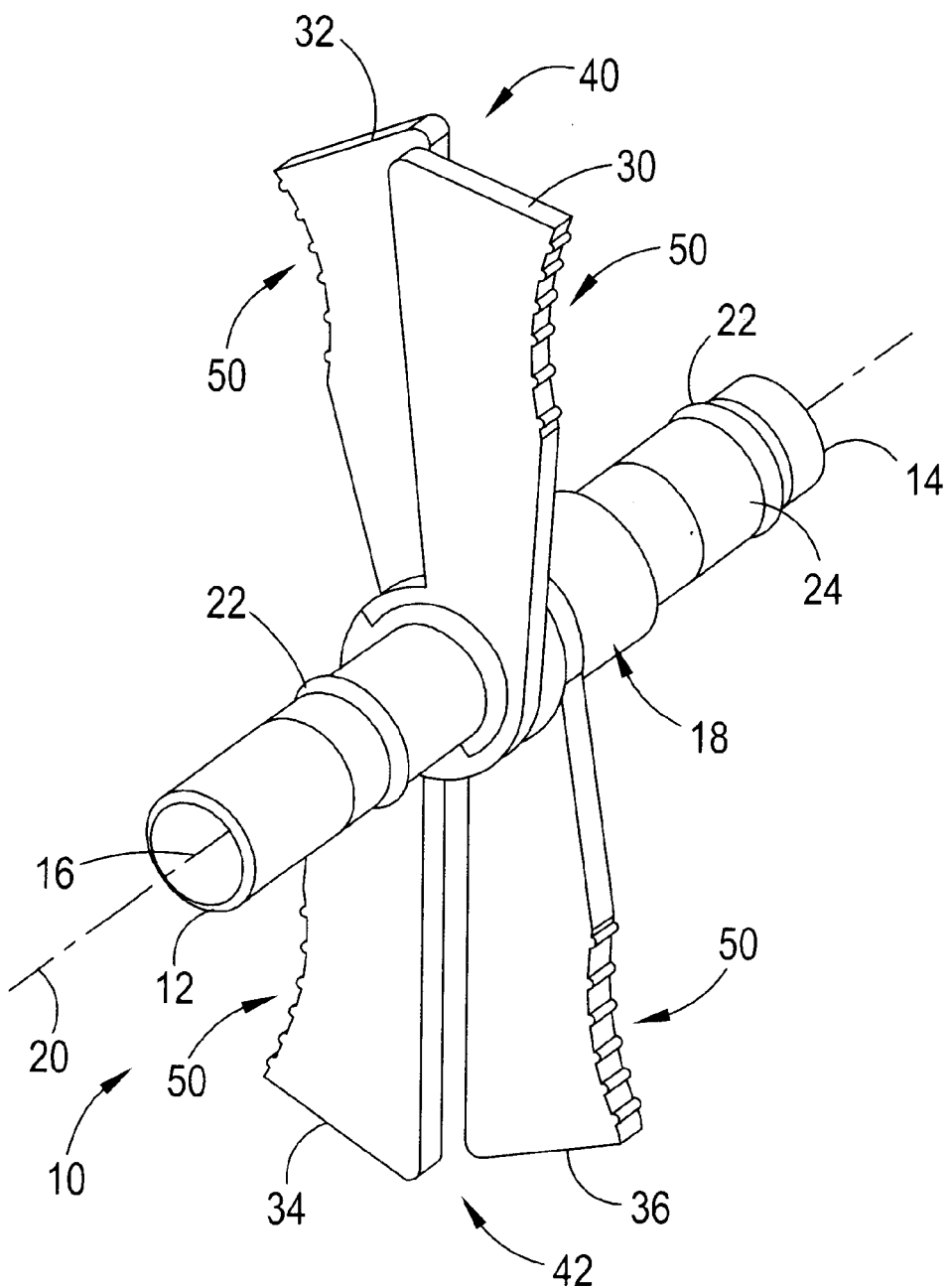
FIG. 1 is a perspective view of a frangible hose connector which is in accordance with an embodiment of the present invention.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Figure 2:
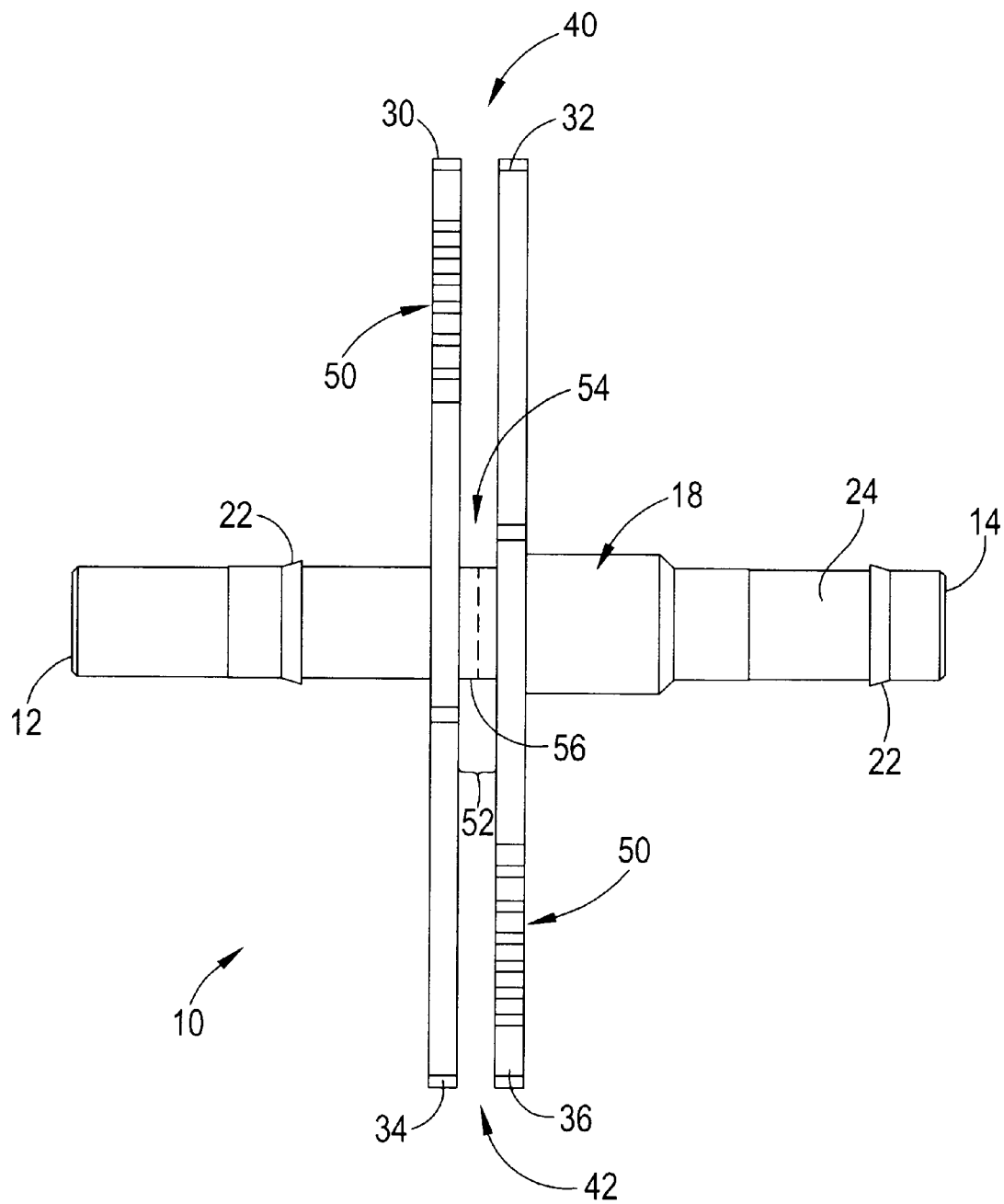
FIG. 2 is a side view of the frangible hose connector illustrated in FIG. 1.
Figure 3:
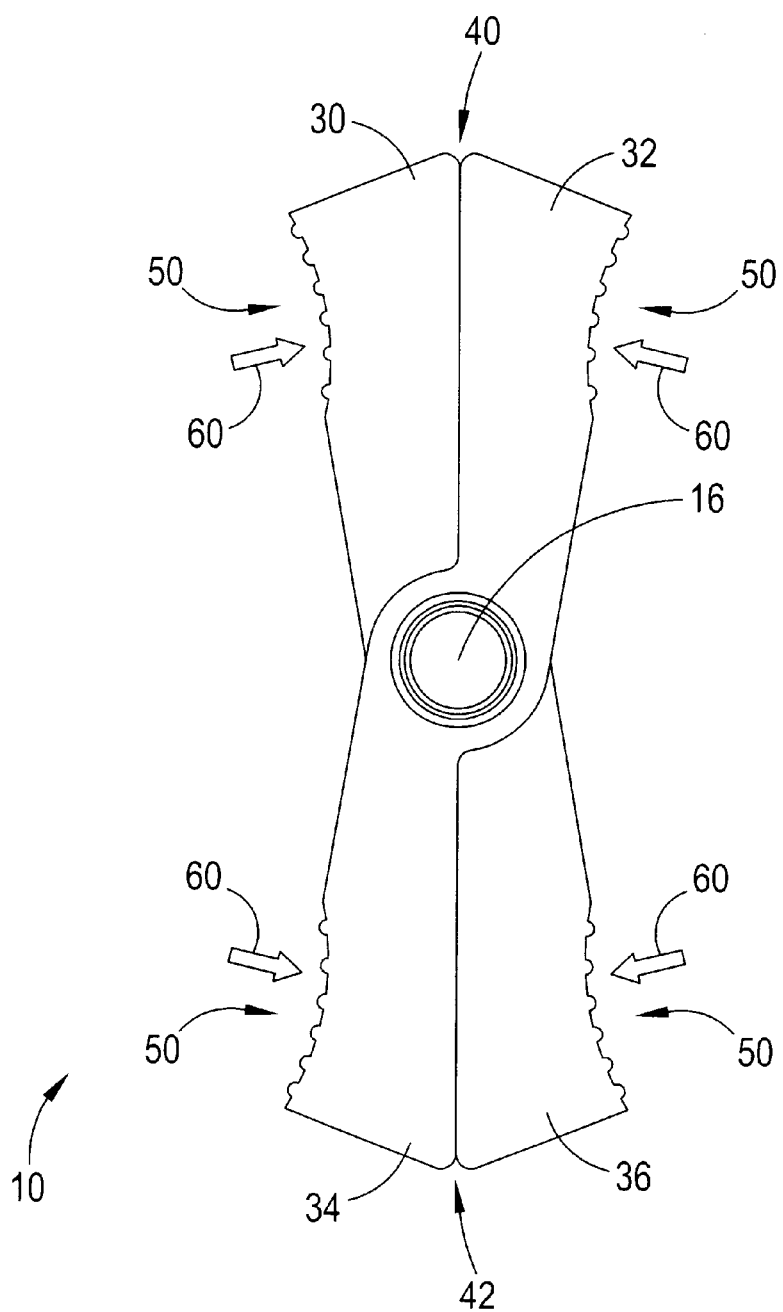
FIG. 3 is a front view of the frangible hose connector illustrated in FIG. 1.
Figure 4:
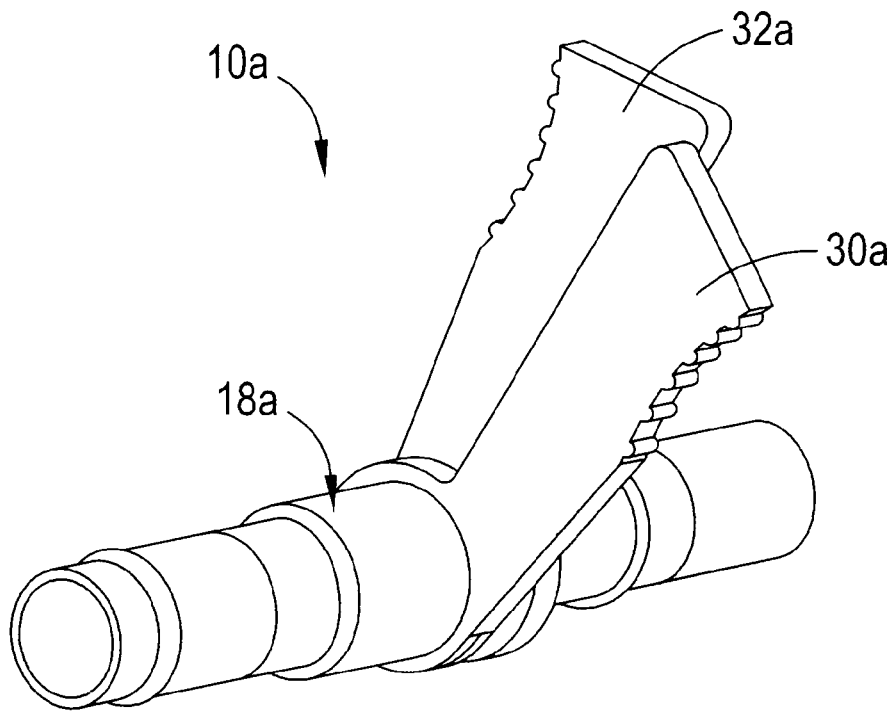
FIG. 4 is a perspective view of a frangible hose connector which is in accordance with another embodiment of the present invention.
Figure 5:
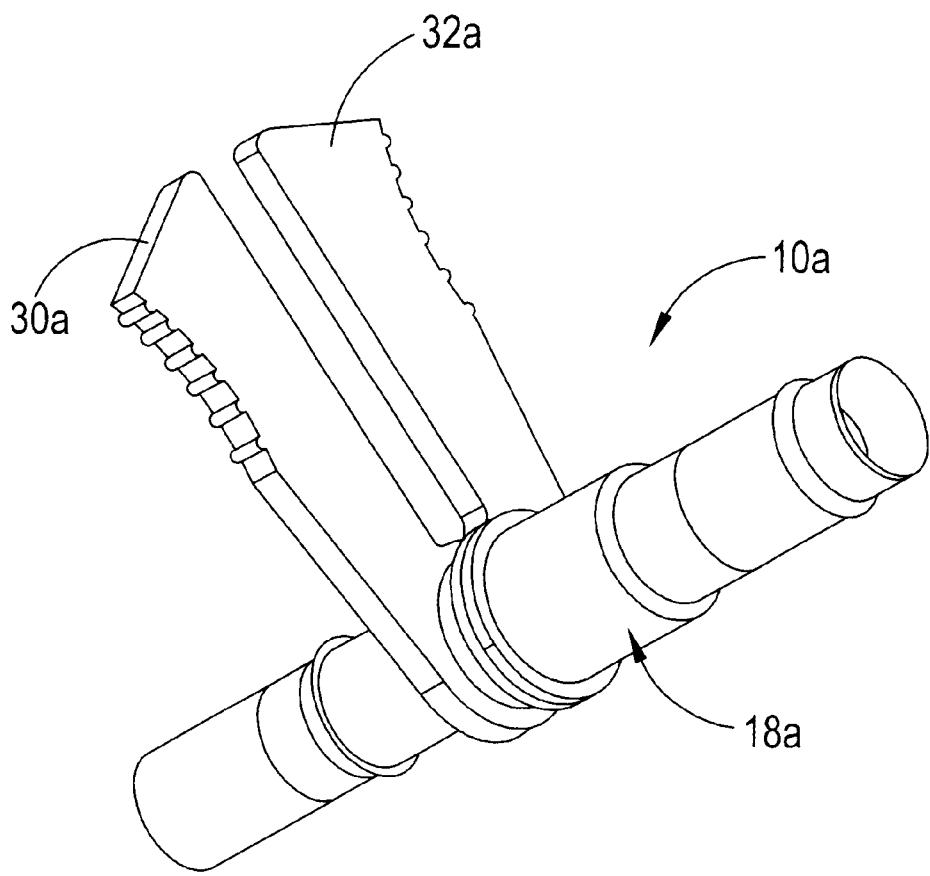
FIG. 5 is another perspective view of the frangible hose connector illustrated in FIG. 4.
Figure 6:
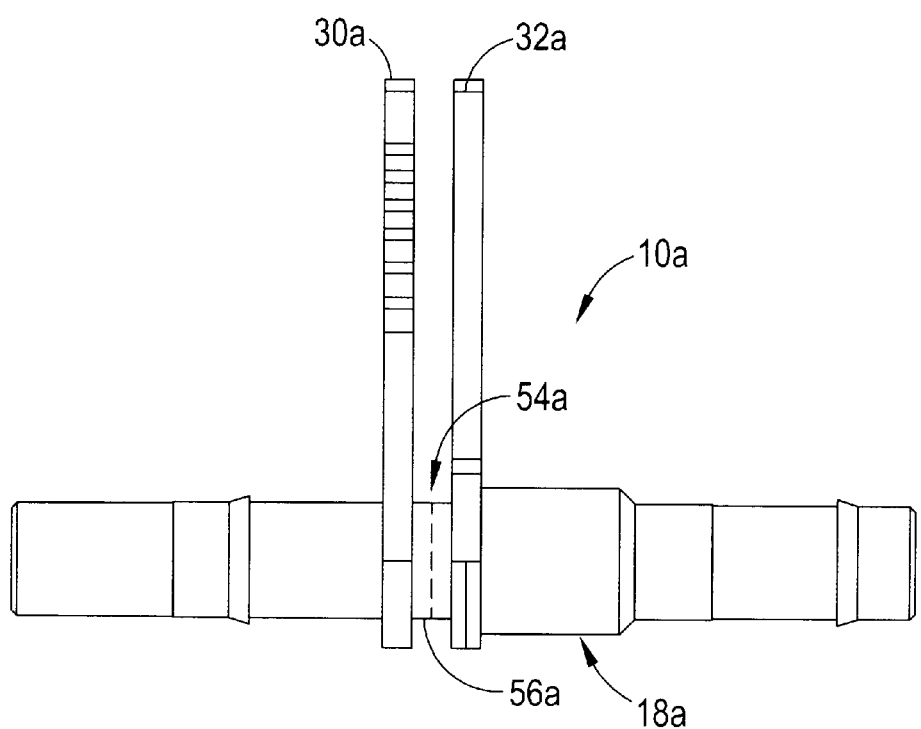
FIG. 6 is a side view of the frangible hose connector illustrated in FIGS. 4 and 5.
Figure 7:
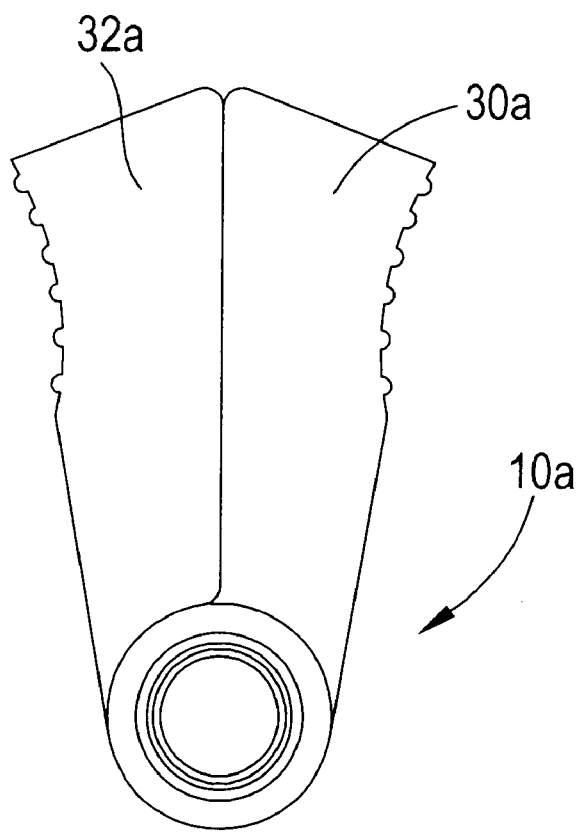
FIG. 7 is a front view of the frangible hose connector illustrated in FIGS. 4 and 5.

Shown in FIGS. 1–3 is a frangible hose connector 10 which is accordance with an embodiment of the present invention. A frangible hose connector 10a which is accordance with another embodiment of the present invention is shown in FIGS. 4–7. Both frangible hose connectors preferably include a knit line at an intended point of fracture, as opposed to a circumferential groove or notch. The knit line has a lower tensile strength than that of the parent material, thereby providing that the connector is relatively easy to fracture. Each connector also includes finger grips which makes breaking the connector easier. The finger grips provide that each connector is configured to be fractured via a twisting or torsion force, as opposed to a bending force. As such, the connectors tend to break in a manner wherein fluid does not fling or spray. The connectors are formed of plastic, and the knit line of each connector is created during the plastic injection molded process, wherein two mold fronts are "squared-up" and meet in the mold cavity to form the knit line. FIGS. 8–12 relate to the injection molding process which is preferably used to form either one of the connectors.

The frangible hose connector 10 shown in FIGS. 1–3 will be described first, and then the frangible hose connector 10a shown in FIGS. 4–7 will be described. Finally, the plastic injection molding process which is preferably used to form either one of the frangible hose connectors 10 or 10a will be described with reference to FIGS. 8–12.

The frangible hose 10 connector shown in FIGS. 1–3 includes a first end 12, and a second end 14 generally opposite the first end 12. A central throughbore 16 extends from the first end 12 to the second end 14, thereby defining a fluid passageway generally through the body 18 of the connector 10, along a longitudinal axis 20 thereof. Each end 12, 14 of the connector 10 is configured to receive a hose or tube. As shown, structure, such as a lip or ridge 22, may be provided on the external surface 24 of the connector 10, proximate each end 12 and 14, for enhancing the engagement with the hose or tube.

Finger gripping levers 30, 32, 34, 36, i.e. finger grips, or another type of break assist structure, are provided on the external surface 24 of the connector, for facilitating the breaking of the connector (and the effective separation of the hoses connected thereto). As shown in FIGS. 1–3, a first pair 40 of finger grips (30, 32) extend upward on the connector 10, and second pair 42 of finger grips (34, 36), generally opposite the first pair 40 of finger grips (30, 32), extend downward on the connector 10. Each pair 40, 42 of finger grips consists of a first finger grip 30, 34 and a second finger grip 32, 36 spaced away from the first finger grip 30, 34. As shown, each finger grip 30, 32, 34, 36 preferably includes grip enhancement structure, such as ridges 50, for enhancing the frictional engagement between a user's index finger or thumb and the finger gripping lever 30, 32, 34, 36.

There is a space 52 (see FIG. 2) between the first (30, 34) and second finger grip (32, 36) of each pair of finger grips, and the space 52 defines a break zone 54. A knit line 56 is disposed in the break zone 54, and the knit line 56 defines an intended point of fracture of the connector 10. The knit line 56 has a lower tensile strength than that of the parent material, thereby providing that the connector 10 is relatively easy to fracture. The knit line 56 effectively defines a line of weakness on the connector 10, and provides that the connector 10 has a tendency to break thereat. The connector 10 is formed of plastic, and the knit line 56 is provided on the connector 10 as an intersection of two mold fronts which meet during the injection molding process. This will be described more fully later herein when the plastic injection molding process is described.

By providing two pairs (40, 42) of finger grips (30, 32, 34, 36), the connector is configured to be fractured via a two hand arrangement, wherein a user uses the thumb and index finger of one hand on one pair of finger grips (40 or 42), and the thumb and index finger of his other hand on the other pair of finger grips (42 or 40), and pinches the finger grips (as indicated by arrows 60 in FIG. 3) together to cause the connector 10 to fracture generally at the knit line 56. An advantage of the two handed design is that the two handed design "balances" the minor traverse twist induced by the longitudinal offset of the finger grips 30, 32, 34, 36 as they are arrayed on either side of the desired break location.

The finger grips 30, 32, 34, 36, and the fact that the break zone 54 is disposed between each finger grip (i.e. between 30 and 32, and between 34 and 36) of each pair, provides that the connector 10 is configured to fracture in a "twist to separate" or torque arrangement, rather than by applying bending forces. A significant advantage of the "twist to separate" design is the elimination of spray and aerosolizing of any contaminated liquid or droplets present within the hose at the time of separation. Prior art connectors which rely upon bending forces to effect fracture snap apart rapidly when they are broken. This instantaneous release of the user's bending energy results in the broken ends accelerating apart at the moment of break. In contrast, the "twist to separate" arrangement assures a gentle non-violent separation of the connector halves since their separation rate is limited by the user's continuing grip of the finger grips throughout the separation process. As a result, contaminated fluid remains within the two broken ends of the connector because the two ends are not flung rapidly apart upon separation of the connector.

As shown in FIGS. 4–7, connector 10a is very much like connector 10, but instead of being configured for "two-handed" fracture, the connector 10a shown in FIGS. 4–7 is configured to be fractured using only one hand (i.e. the thumb and index finger of one hand of a user). As such, the connector includes only a single pair of finger grip levers 30a, 32a (as opposed to two pairs of finger grip levers) extending from the body 18a of the connector 10a. Other than this difference, the two connectors (10 and 10a) are identical.

Each frangible hose connector 10 and 10a allows two flexible hoses or tubes, previously joined for use, to be subsequently hand separated without tools. Severing the connection may be desirable in instances such as disconnecting a medical drain bag from a catheter and could prove especially helpful to patients under self-care who perform the operation themselves. Hand force required to separate the connector is preferably kept as low as possible while providing part integrity under use. Use of either connector may not be limited to medical applications.

Each frangible hose connector 10, 10a provides effectively two features, each of which may possibly be provided without the other. First, each connector provides a knit line 56, 56a which makes fracturing the connector easier. Second, each is configured to fracture in a "twist to separate" arrangement. While it is preferred that each connector 10, 10a provide both—a knit line and a "twist to separate" arrangement—it is possible to provide a connector which only has one of the features, i.e. either a knit line or a "twist to separate" arrangement. In other words, a connector can be provided with a knit line, where the connector is configured to be fractured using bending forces. As a result of including the knit line, a connector is easier to fracture than if the connector were to have a circumferential groove or notch. Likewise, a connector can be provided without a knit line, but be configured to be breakable in a "twist to separate" arrangement. For example, finger grips can be provided, and a circumferential groove or notch can be provided at the intended point of fracture. Regardless of what structure is provided at the intended point of fracture, as a result of providing that the connector is breakable in a "twist to separate" arrangement, as opposed to having to apply bending forces, the connector breaks in a more controlled manner, wherein contaminated fluid does not tend to spray from the connector into the surrounding environment when the connector fractures.

Figure 8:
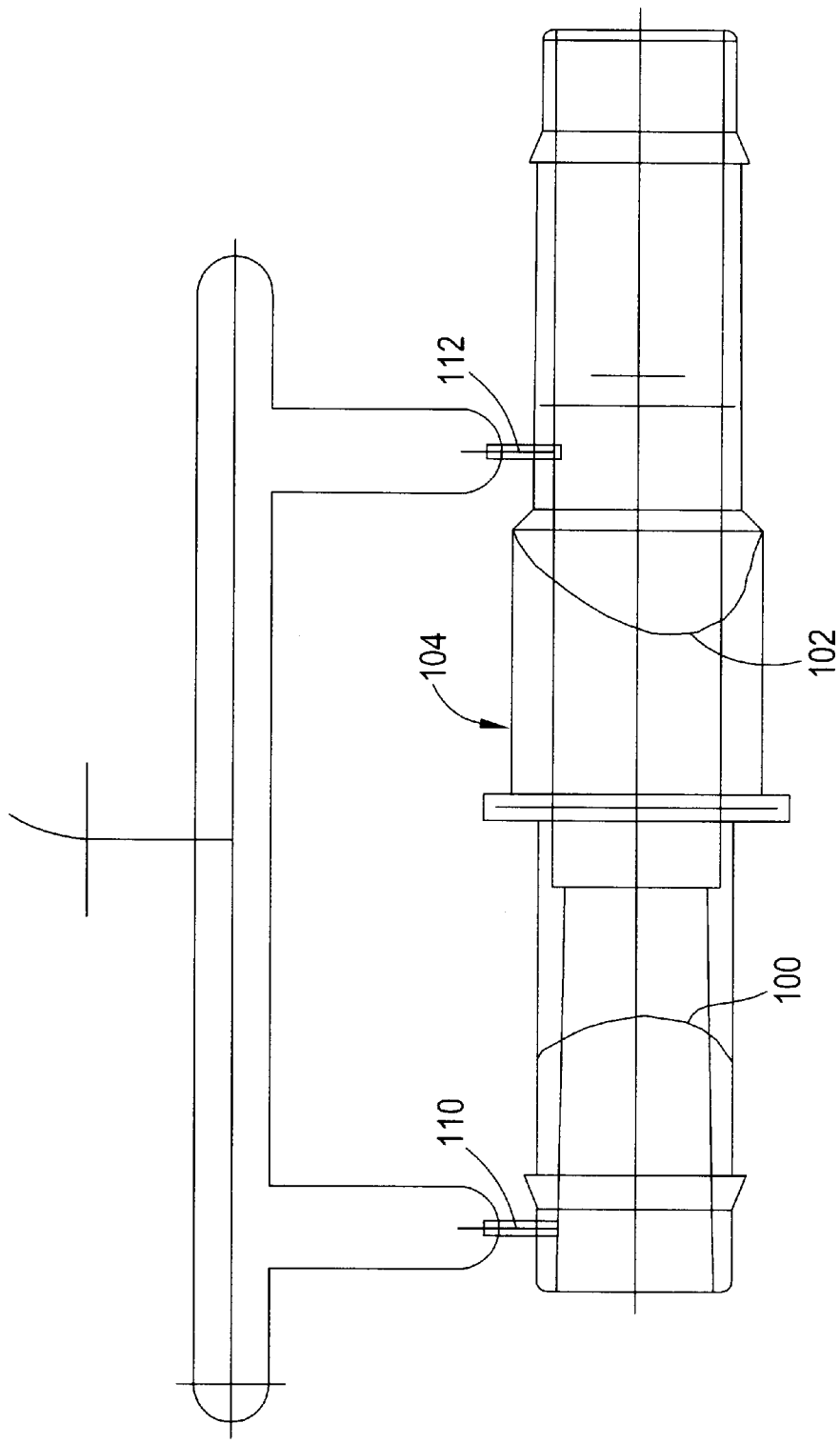
FIGS. 8–12 are views showing the progression of mold fronts in a mold cavity such that two mold fronts meet to form a knit line, wherein the injection method can be used to make either one of the frangible hose connectors shown in FIGS. 1–3 or 4–7.
Figure 9:
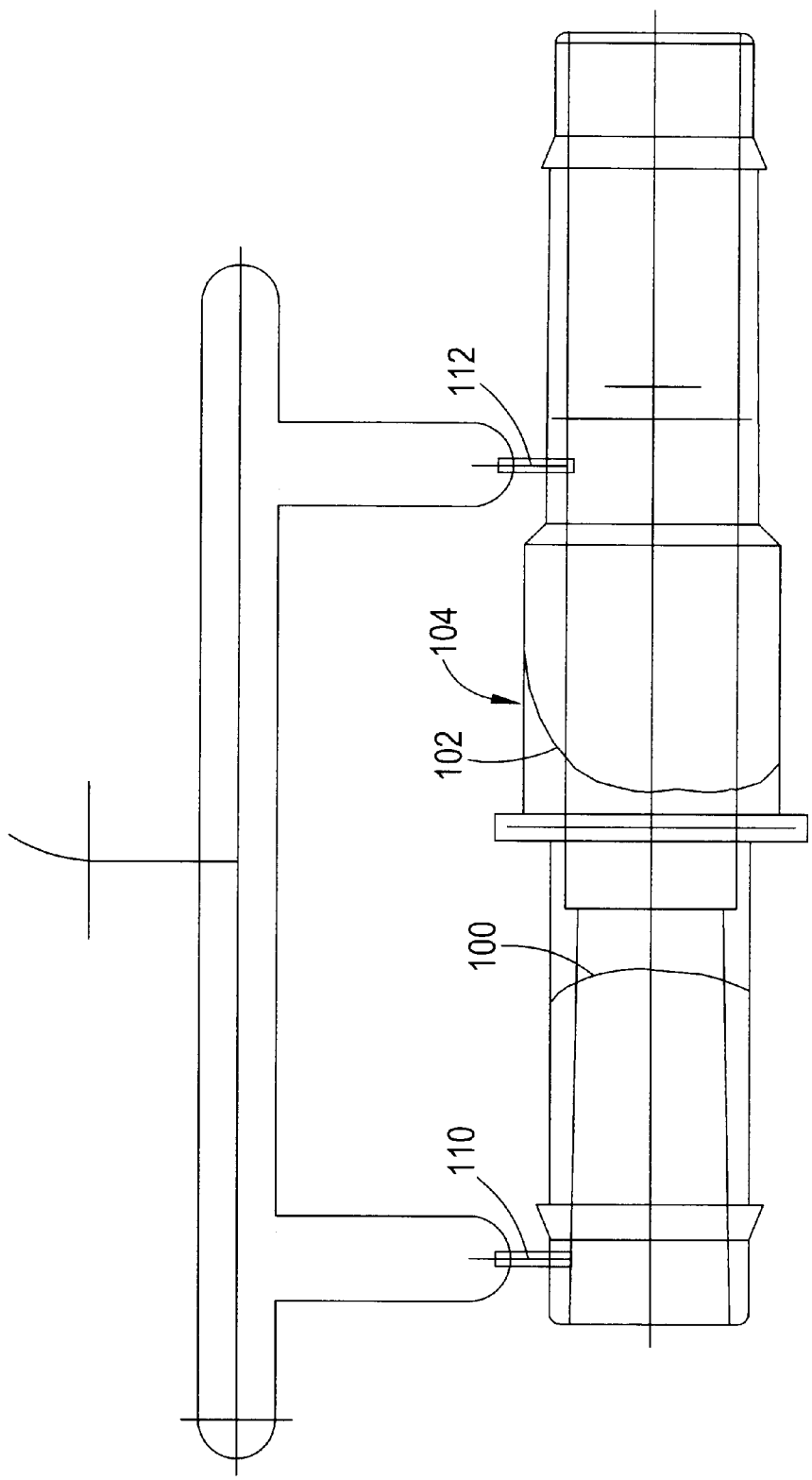
Figure 10:
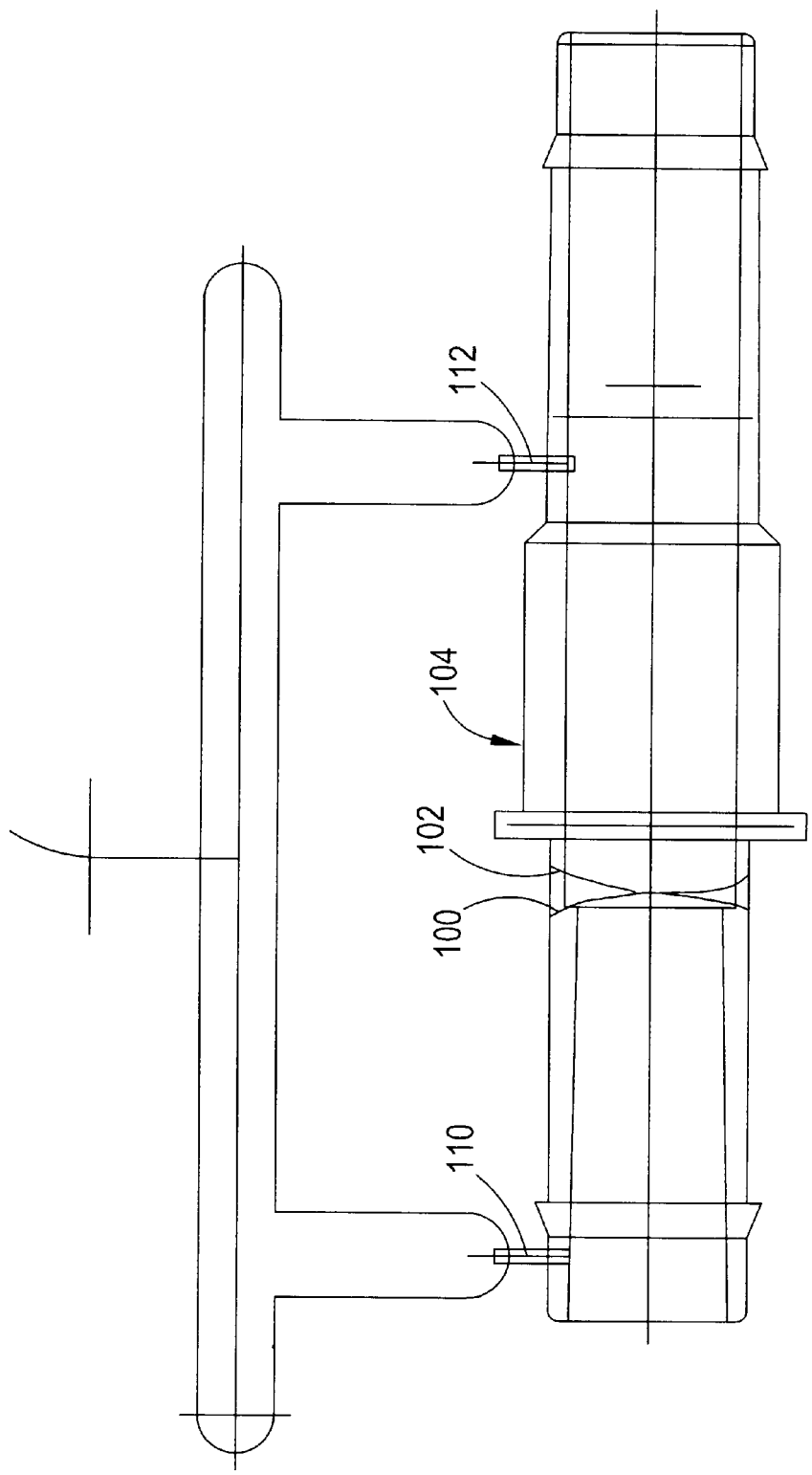
Figure 11:
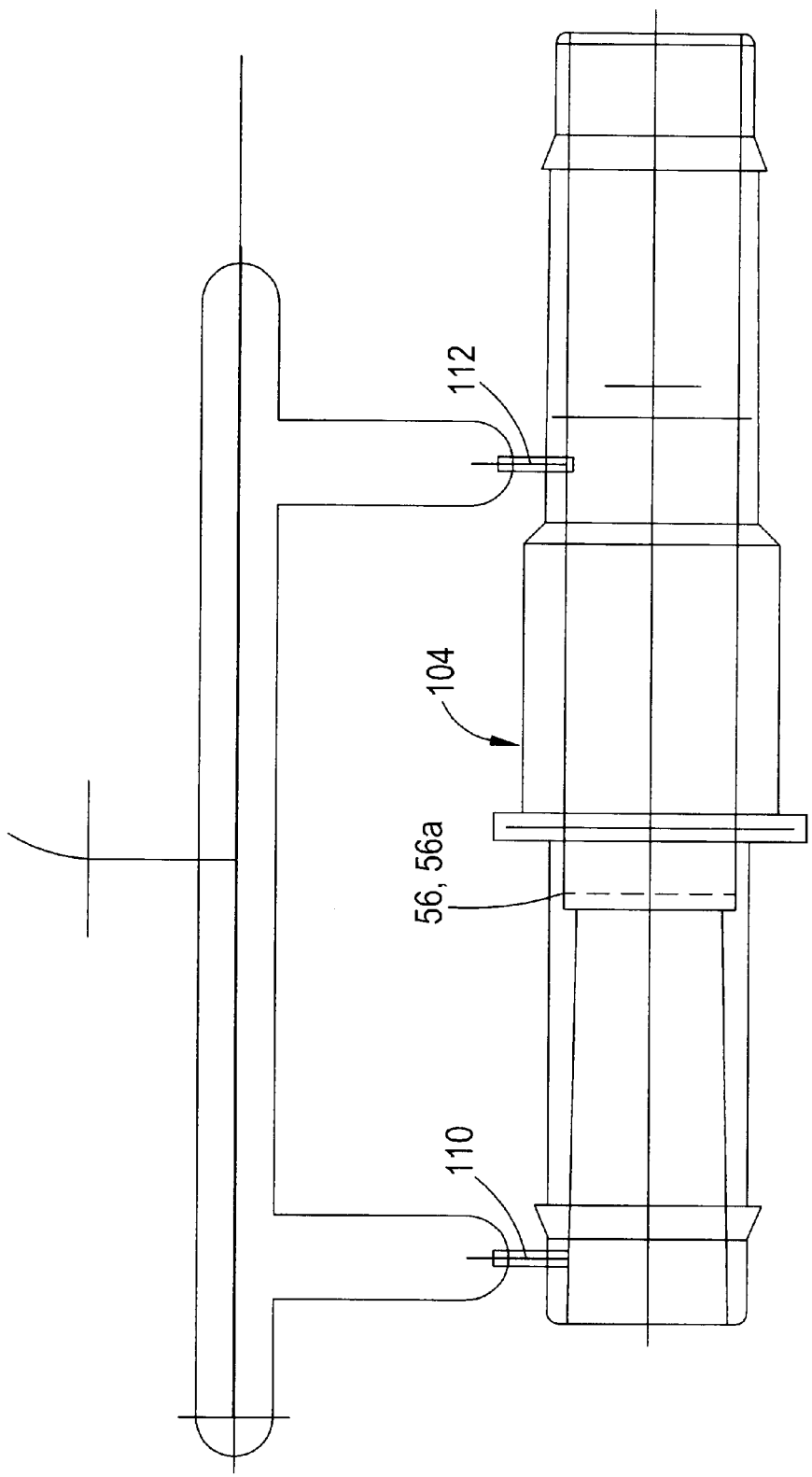
Figure 12:
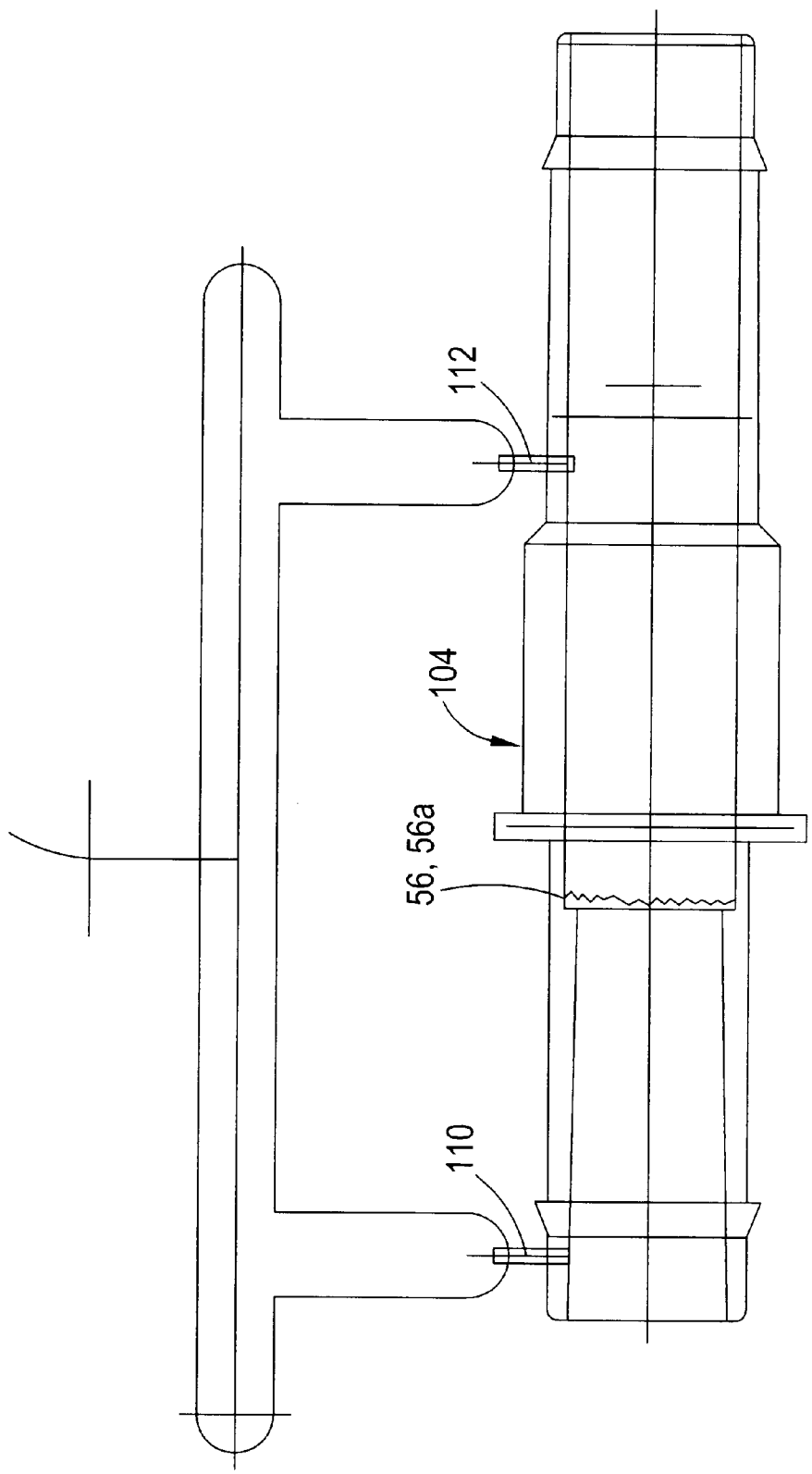

In forming either connector 10 or 10a, preferably a plastic injection molding process is used wherein two mold fronts meet in the mold cavity to define the knit line. FIGS. 8–12 provide a sequence of views showing the progression of the mold fronts 100, 102 in the mold cavity 104 during the molding process (i.e. FIG. 8 shows the mold fronts 100, 102 at an earlier point in time than FIG. 9, which shows the mold fronts 100, 102 at an earlier point in time than FIG. 10, which shows the mold fronts 100, 102 at an earlier point in time than FIG. 11, which shows the mold fronts 100, 102 at an earlier point in time than FIG. 12). As shown in the progression, the mold fronts 100, 102 eventually meet in the mold cavity 104 (see FIG. 12) generally at the intended point of fracture (i.e. at the knit line 56, 56a) of the resulting molded piece 10 or 10a.

The junction where the resin fronts meet results in an irregular molding flaw which is generally known as a "knit line". A knit line may not be felt upon the surface, however its presence can often be seen in transparent materials as an irregular hazy separation between the opposite ends of a part. A knit line is created by the head on meeting and stopping of oppositely flowing molten resin fronts. Therefore, a knit line generally provides a section having relatively low tensile strength.

Preferably, when the connector 10 or 10a is molded, a part configuration is employed which is specifically designed to control the flow of molten plastic within the mold and thereby yield a part in which the PSI strength of the material within a desired break zone 54, 54a is actually lower than that of the parent material. As shown in FIGS. 8–12, the method employs two mold cavity fill points 110, 112, one on either side of the desired break zone 54, 54a. Two gates placed near opposite ends of a part or two divided flow fronts from one gate could be equally effective. When using two gates, the gates are strategically positioned on the part and sized to assure that upon cavity fill, the two molten plastic resin fronts meet within the desired break zone.

Flow fronts within a mold cavity are often irregular in shape. Molten resin flow generally spreads radially from the gate. Flow is usually caused to become irregular when it is stopped, diverted or impeded by features within the mold cavity. In each of the connectors 10 and 10a described above, it is advantageous to have a controlled knit line. As such, it is beneficial to "square-up" the opposing flow fronts and redirect them more evenly into the desired break zone.

Because of the way knit lines are formed, it is possible for very little exchange or mixing of the polymer from the opposite flow fronts to occur, especially if neither flow front succeeds in advancing against the other once the two have met. Under perfect conditions, if the fronts do not exchange polymer chains and only abut very tightly, a part which is actually composed of two weakly bonded pieces can occur.

Due to their weak nature, knit lines are usually objectionable in a molded part. However, since a weak connection between the opposite halves is actually desired in either one of the connectors 10 or 10*a*, it is preferable to incorporate a controlled knit line at the desired break zone 56, 56*a*. Determining the correct position and sizing of the gates within the mold in order to generate a knit line at the desired location can be quickly achieved using any of the injection molding analysis program which are commercially available, such as the MoldFlow® analysis program. Here is data relating to a MoldFlow® analysis which was conducted:

```
MFLDD          2.0                    11 SUMMARY         -FINAL FILLING        -DDOM
*****************************************************************
*                                                         *
*                       DUAL DOMAIN                       *
*                      MULTI-LAMINATE                     *
*                      FILLING ANALYSIS                   *
*                                                         *
*****************************************************************
Restart File Restart File Name               NONE
Cooling Results Cooling Interface File Name     NONE
Model Information MODEL (master) file name        larrythree48
    17305   nodes, highest no.= 17305
    34610 elements, highest no.= 34610
    34610 triangular elements
Maximum aspect ratio of  101.020 at element    34378
Minimum aspect ratio of    1.158 at element    34153
Average aspect ratio of triangular elements       1.613
Mesh Match Quality     80.8%
Boundary Condition File Boundary Condition File Name    larrythree49.bf3
Material Information Material DATABASE type         KEYWORD
SUPPLIER/file name             BASFWIS
GRADE code                     BA2403
Viscosity MODEL order          2
PVT MODEL order                1
Material description
BA2403 POLYSTYROL 158 K BASF AG VI(235)110 BASF AG SEP92
MFI 3.0 cc/10 min. MOLD FLOW INDEX
Material Compressibility       Moldflow PVT Model
Extensional Viscosity Effects  OFF
Warpage Model                  Residual Strain
Machine Settings Maximum Injection Pressure       14503.77    psi
Maximum Clamp Tonnage            11023.11    sh. ton
Injection Node(s)

Number of injection nodes         2
Injection node numbers
 11865   2855
Molding Conditions Mold temperature                 110.00    deg. F.
Melt temperature                 455.00    deg. F.
Injection time                     0.27    sec
Total Volume                       0.07    cu. inch
Flow rate                          0.24    cu. in/sec
Analysis Options Nominal Injection Profile:
  % Shot Vol   % Nominal Flow Rate 0.0            0.0
       0.0          100.0
     100.0          100.0
```

-continued

```
    100 ################################
        #                               #
        #                               #
  %  80 #                               #
        #                               #
  F     #                               #
  L  60 #                               #
  O     #                               #
  W     #                               #
     40 #                               #
  R     #                               #
  A     #                               #
  T  20 #                               #
  E     #                               #
        #                               #
      0 #--------|--------|--------|--------|--------#
           20       40       60       80      100
                     % SHOT VOLUME
```

| | |
|---|---|
| Maximum Flow Rate (Based on Profile) | 0.24 cu. in/sec |
| Constant Pressure Mode | Automatic |
| Change-over to Pressure | Automatic |
| Change-over to Pressure Factor | 1.000 |
| Stroke Volume Determination | Automatic |
| Mold Conductivity | 16.76 BTU/ft/hr/deg F. |
| Mold Density | 486.94 lb/cu. ft |
| Mold Heat Capacity | 0.1099 BTU/lb/deg F. |

Output Options

| | |
|---|---|
| No. intermediate results files | 0 |
| Time Series Step Mode | Constant Volume Increments |
| Number of % Volume Increments | 20 |
| No. Restart Files | 0 |
| Screen Output Format | Short Format |

Numerical Parameters

| | |
|---|---|
| Pressure Iteration Limit | 1000 |
| Pressure Iteration Tolerance | 0.0005000 |
| Viscosity Iteration Limit | 10 |
| Viscosity Iteration Tolerance | 0.0100000 |
| Density Iteration Limit | 20 |
| Density Iteration Tolerance | 0.0100000 |
| Laminations in Mold Wall | 15 |
| Grid Thickness Ratio | 8.00 |
| Laminations in Plastic half thickness | 10 |
| Nodal Growth Mechanism | Fast |
| Requested Growth Steps | 11 |
| Normal Growth Increment | 5.0% |
| Fast Growth Increment | 250.0% |
| Steps between Fast Growth Steps | 3 |
| Result File Core Name | larrythree51 |

```
*******************************************
*    FILLING PHASE RESULTS SUMMARY    *
*******************************************
```

Maximum–Minimum Values

| | | | |
|---|---|---|---|
| Max Pressure | (at Fill) | 2734.3721 | psi |
| Max Pressure | (during cycle) | 2734.4004 | psi |
| Max Clamp Force | (during cycle) | 0.1894 | sh. ton |
| Total projected area | | 0.1792 | sq. inch |
| Actual injection time | | 0.2776 | sec |
| Min Temperature | (at Fill) | 373.6260 | deg. F. |
| Max Temperature | (at Fill) | 457.9668 | deg. F. |
| Min Temperature | (flow front) | 416.0939 | deg. F. |
| Max Temperature | (flow front) | 455.1696 | deg. F. |
| Max Shear Rate | (at Fill) | 584901.19 | l/sec |
| Max Shear Rate | (during cycle) | 1745030.25 | l/sec |
| Max Shear Stress | (at Fill | 46.7472 | psi |
| Max Shear Stress | (during cycle) | 165.8165 | psi |
| Max Bulk Shear Rate | (at Fill) | 150601.52 | l/sec |
| Max Bulk Shear Rate | (during cycle) | 697710.25 | l/sec |
| Max Bulk Shear Stress | (at Fill) | 58.4340 | psi |
| Max Bulk Shear Stress | (during cycle) | 184.2406 | psi |
| Max Solidification Time (Tri. Elements) | | 5.60 | sec (Element29327) |
| Min Solidification Time (Tri. Elements) | | 0.22 | sec (Element34380) |

Throughputs

-continued

| Node | Throughput [cu. inch] |
|---|---|
| 11865 | 0.023 |
| 2855 | 0.043 |

| | |
|---|---|
| Pressure when Throughput exceeded Part Volume | 2734.372 psi |
| Pressure when Displaced Ram Volume exceeded Part Volume | 2734.372 psi |

Output files produced

| | | |
|---|---|---|
| No. Restart Files(s) | | 1 |
| 0.277636 sec | larrythree51.fr0 | |
| No. Intermediate Results File(s) | | 0 |
| Nodal Result File | larrythree51.fnr | |
| Elemental Result File | larrythree51.fer | |
| Summary File | larrythree51.fsu | |
| Time Series File | larrythree51.fts | |
| Report Template File | larrythree51.905 | |
| Machine Interface File | larrythree51.fpo | |

Actual Injection Profile

| % Shot vol. | % Nom. flow rate |
|---|---|
| 0.0 | 63.4 |
| 10.0 | 93.9 |
| 20.0 | 97.7 |
| 30.0 | 98.4 |
| 40.1 | 98.6 |
| 50.1 | 98.8 |
| 60.1 | 99.0 |
| 70.1 | 99.2 |
| 80.1 | 99.3 |
| 90.1 | 99.2 |
| 99.0 | 99.0 |
| 99.8 | 63.9 |

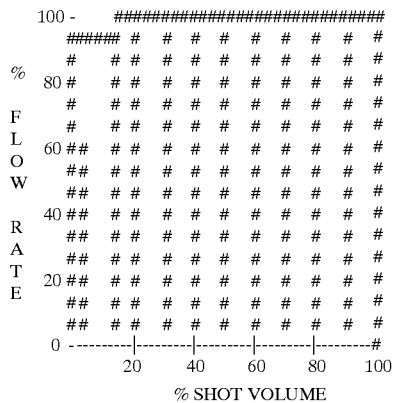

Analysis Display Summary

| | | Flow rate | | | |
|---|---|---|---|---|---|
| Time sec | Volume % | Actual cu. in/sec | Nominal % | Pressure psi | Clamp force sh. ton |
| 0.01515 | 5.00 | 0.24 | 96.9 | 156.70 | 0.00 |
| 0.02924 | 10.04 | 0.24 | 97.3 | 279.55 | 0.00 |
| 0.04323 | 15.07 | 0.24 | 97.5 | 297.89 | 0.00 |
| 0.05706 | 20.07 | 0.24 | 98.1 | 393.28 | 0.00 |
| 0.07083 | 25.08 | 0.24 | 98.4 | 411.01 | 0.00 |
| 0.08461 | 30.10 | 0.24 | 98.5 | 501.30 | 0.00 |
| 0.09834 | 35.10 | 0.24 | 98.6 | 566.20 | 0.01 |
| 0.11213 | 40.13 | 0.24 | 98.7 | 648.71 | 0.01 |
| 0.12586 | 45.14 | 0.24 | 98.9 | 668.04 | 0.01 |
| 0.13969 | 50.20 | 0.24 | 98.9 | 747.62 | 0.01 |
| 0.15343 | 55.21 | 0.24 | 99.0 | 800.14 | 0.01 |
| 0.16710 | 60.21 | 0.24 | 99.1 | 823.90 | 0.01 |
| 0.18079 | 65.22 | 0.24 | 99.2 | 829.48 | 0.01 |
| 0.19446 | 70.22 | 0.24 | 99.3 | 870.79 | 0.01 |
| 0.20818 | 75.25 | 0.24 | 99.3 | 941.32 | 0.02 |
| 0.22185 | 80.26 | 0.24 | 99.3 | 1083.87 | 0.03 |

-continued

| | | | | | |
|---|---|---|---|---|---|
| 0.23557 | 85.26 | 0.24 | 99.3 | 1102.36 | 0.03 |
| 0.24939 | 90.27 | 0.24 | 99.0 | 2019.75 | 0.11 |
| 0.26311 | 95.27 | 0.24 | 99.0 | 2369.04 | 0.14 |
| 0.27334 | 99.01 | 0.24 | 99.0 | 2734.37 | 0.18 |
| 0.27759 | 99.84 | 0.04 | 18.3 | 2734.37 | 0.19 |
| 0.27764 | 99.84 | 0.04 | 17.7 | 2734.37 | 0.19 |

\* Change to Press. Control at 99.0% Shot Volume (0.27334 sec)
Pressure = 2734.372 psi
Filling Warning and Error Diagnostics Execution Times

EXECUTED 5-MAR-2001 7:13
COMPLETED 5-MAR-2001 9:20

While embodiments of the present invention are shown and described, it is envisioned that those skilled in the art may devise various modifications of the present invention without departing from the spirit and scope of the foregoing disclosure.

What is claimed is:

1. A frangible hose connector comprising: a body having a first end, a second end generally opposite the first end, and a throughbore which extends through the body from the first end to the second end; and a knit line in the body, between the first and second ends, said knit line defining an intended point of fracture of the body.

2. A frangible hose connector as recited in claim 1, wherein said frangible hose connector has an intended point of fracture but does not include a circumferential groove or notch.

3. A frangible hose connector as recited in claim 1, wherein said knit line has a lower tensile strength than that of parent material which comprises the body.

4. A frangible hose connector as recited in claim 1, wherein said body is formed of plastic.

5. A frangible hose connector as recited in claim 1, wherein the knit line is created during a plastic injection molded process, wherein the flow of molten plastic within the mold cavity is controlled during the molding process in a manner which creates the knit line.

6. A frangible hose connector as recited in claim 1, further comprising break assistance structure on the body.

7. A frangible hose connector as recited in claim 6, wherein said break assistance structure comprises at least one finger grip lever extending from the body.

8. A frangible hose connector as recited in claim 7, wherein said body includes a longitudinal axis, and said at least one finger grip lever extends perpendicular to the longitudinal axis of said body.

9. A frangible hose connector as recited in claim 6, wherein said break assistance structure comprises a plurality of finger grip levers extending from the body.

10. A frangible hose connector as recited in claim 6, wherein said break assistance structure comprises a pair of finger grip levers extending from the body.

11. A frangible hose connector as recited in claim 6, wherein said break assistance structure comprises two pairs of finger grip levers extending from the body.

12. A frangible hose connector as recited in claim 6, wherein said break assistance structure is configured to provide that said connector is configured to be fractured via a twisting or torsion force, as opposed to a bending force.

* * * * *

UNITED STATES PATENT AND TRADEMARK OFFICE
CERTIFICATE OF CORRECTION

PATENT NO. : 6,739,628 B2
DATED : May 25, 2004
INVENTOR(S) : Rowland W. Kanner, Michael Parcus and Larry Lee Young It is certified that error appears in the above-identified patent and that said Letters Patent is hereby corrected as shown below:

Column 5,
Line 15, "the connector" should be -- the connector 10 --.

Column 7,
"BA2403 POLYSTYROL 158 K BASF AG VI (235)110 BASF AG SEP92" should be
-- BA2403 PS POLYSTYROL 158 K BASF AG VI (235)110 BASF AG SEP 92 --

Signed and Sealed this

Third Day of August, 2004

JON W. DUDAS
*Acting Director of the United States Patent and Trademark Office*